Feb. 10, 1942.   C. S. PIDGEON   2,272,896
SAFETY INNER TUBE
Filed Dec. 7, 1939

INVENTOR
Charles S. Pidgeon
BY Ely & Frye
ATTORNEYS

Patented Feb. 10, 1942

2,272,896

UNITED STATES PATENT OFFICE 2,272,896

SAFETY INNER TUBE

Charles S. Pidgeon, Akron, Ohio, assignor to The Firestone Tire & Rubber Company, Akron, Ohio, a corporation of Ohio Application December 7, 1939, Serial No. 307,995

2 Claims. (Cl. 152—342)

This invention relates to safety inner tubes for pneumatic tires, and more especially it relates to safety inner tubes of the type that consist of two or more chambers, and having one or more openings communicating between the chambers, so that when a blow out occurs the air will be evacuated rapidly only from one of the chambers, the other chamber losing its air more slowly so as to enable the vehicle to be brought to a stop in ample time before the tube becomes entirely flat.

With the advent of the modern high speed motor vehicles using pneumatic tires, a serious safety hazard has arisen, due to the possibility of the tire being ruptured, either by mere failure of the casing, or due to sharp objects rending a large hole in the tire. With a tire of a large cross section as compared to the rim diameter, a sudden release of the air pressure in the tire causes a very sudden change in the effective rolling radius of the tire and often causes the operator to lose control of the vehicle, resulting in a serious accident and damage.

It has heretofore been proposed to use double-chamber tubes one within the other in which the inner chamber has an inextensible wall, so that in the event that the outer casing and outer chamber of the inner tube is ruptured, the weight of the vehicle will be temporarily sustained by the remaining air pressure in the inner chamber. In some of these previous double-chamber tubes, a very small aperture was provided in the inextensible wall so that the air pressure retained in the inner chamber would not pass to the outer chamber in the event of a blow out in the outer chamber, until the operator would have time to bring the vehicle to a safe stop. However, in such devices there has been a serious objection to the inflation of such devices, since, in order to retain sufficient air pressure in the inner chamber for a sufficient length of time to permit a safe stop, it was necessary to make the aperture, or port in the inextensible wall much smaller than the passage of the inflating valve. Therefore, during the inflation of such a tube, pressure will quickly build up in the inner chamber and will give an incorrect indication of the inflation of the outer chamber. In order to overcome this objection it has been proposed to make the aperture, or port at least as large as the cross sectional area of the inflating device and associate with it a valve which operates automatically under influence of differential pressure between the inner and outer chambers in the event of a sudden release of pressure in the outer chamber to restrict, or control the flow from the inner chamber through the port. Such prior devices, although being a great improvement over devices having no control valve between the chambers, still have certain objections which, it is an object of the present invention to overcome.

The present invention provides means responsive to centrifugal force developed during the rotation of the wheel which provides a control auxiliary to the differential pressure between the chambers to more effectively and positively control flow of air through the orifice in the event that the pressure is suddenly released in the outer chamber. With the speed responsive device of the present invention, it is possible to reduce the rate of flow from the inner to the outer chamber during the time when the vehicle is operating at speeds which are considered to be very dangerous without affecting the rate at which the tube can be inflated, or deflated when the tire is being removed from the rim.

Accordingly, it is a major object of the present invention to provide a double-chamber safety tube having an inextensible inner wall and having means to inflate both inner and outer chambers simultaneously and at substantially the same rate, and means responsive to centrifugal force to control the communication between the chambers when the wheel is operated above a predetermined speed.

A further object is to provide a double-chamber safety tube construction in which a valve device is associated with a port between the chambers which valve is responsive to centrifugal force to effectively reduce the communication between the chambers for speeds above a predetermined minimum.

Another object is to provide a tube of the type referred to in which the effective cross sectional area of the port is considerably reduced in response to centrifugal force, but which will permit a very small amount of air to pass, whereby when the centrifugal force becomes ineffective, the differential pressure between the chambers of the tube will not keep the valve in closed position.

Another object is to provide an improved valve for the purpose aforesaid, which will operate in response to differential pressure between the two chambers and which will also be responsive to centrifugal force due to rotation of the wheel above predetermined speeds to control the communication between the chambers.

Another object is to provide an inner tube for pneumatic tires, said inner tube comprising two concentric annular chambers, one arranged inside of the other and having a passage in the wall separating one chamber from the other, said passage having an effective cross sectional area at least substantially as great as that of the inflating means, a flap valve associated with said passage adapted to normally remain open but responsive to a pressure differential between said chambers and/or centrifugal force to reduce the effective cross section of said passage to thereby control the rate of flow therethrough.

A still further object is to provide a valve as aforesaid on the inside of the wall between the two chambers which is provided with a weight, which causes the valve to operate to restrict the passage when the wheel is operated above a predetermined speed, regardless of a pressure differential existing between the chambers, whereby at such speed, and above, the valve is automatically held in closed position as a safety measure before any pressure differential develops as a result of a blowout or puncture and which valve will be open again when it is desired to deflate the tire as when demounting, or to inflate the tube.

Other objects will be manifest as the specification proceeds.

Figure 1:
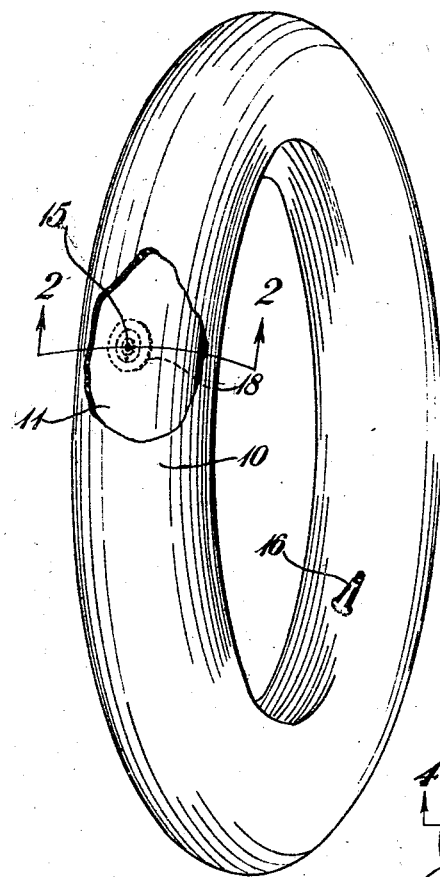
Figure 1 is a perspective view of a safety inner tube embodying the invention, a part being broken away to reveal the improved safety valve therein.
Figure 2:
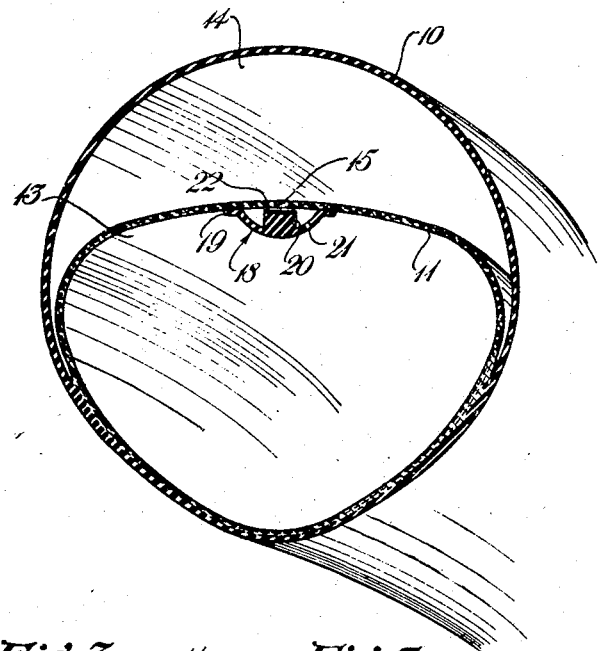
Figure 2 is a section, on a larger scale, on the line 2, 2 of Figure 1.
Figure 3:
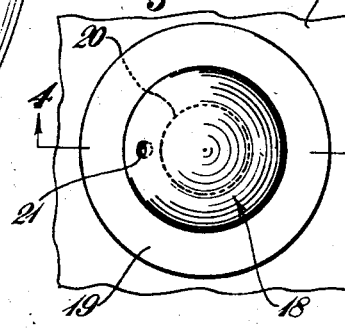
Figure 3 is a top plan view of the valve shown in Figure 2.

Referring now to the drawing, especially Figures 1 and 2 thereof, there is shown a safety inner tube comprising an outer tubular structure 10 composed of elastic material such as rubber composition or the like, and an inner tubular structure 11 composed of impervious non-elastic material such as rubberized fabric or the like. The tubes 10, 11 are concentrically arranged, the tube 11 being of smaller outside diameter than the tube 10. The tubes are of substantially the same inside diameter, and tube 11 is permanently united with the outer tube 10, as by being vulcanized thereto, throughout a circumferential region of substantial transverse area at the inner circumference of the inner tube. The arrangement provides stability and stiffness to the tube, and reinforces it in the region where it abuts a tire rim when mounted for use in a tire.

The tube 11, in effect, constitutes a partition that divides the interior of the inner tube into two concentric circumferential compartments or chambers 13, 14, of which chamber 13 is located entirely within the tube structure 11 and chamber 14 is disposed exteriorly of the structure 11 and circumscribes the same. Communication between the chambers 13, 14 is effected by means of a relatively small aperture or port 15 in the periphery of the tube structure 11, in the central plane of the inner tube. A single valve stem 16 of any usual or preferred construction is provided for the inflation and normal deflation of the inner tube. Said valve stem is located in the inner circumference of the inner tube, either in the medial plane of the tube or somewhat to one side thereof as shown. The valve stem opens into the inner compartment 13 of the inner tube, and preferably is located 180° from the aperture 15 in the inner structure 11.

Figure 4:
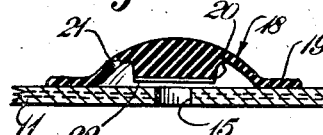
Figure 4 is a section on the line 4, 4 of Figure 3, showing the valve in open position.
Figure 8:
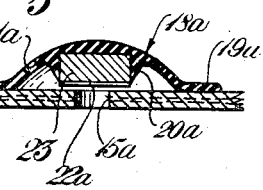
Figure 8 is a section on the line 8, 8 of Figure 7.

While the inner tube is being inflated through the agency of the aforesaid valve stem 16, it is desirable that the air pass readily through the aperture or port 15, from the inner chamber 13 to the outer chamber 14, to provide uniform pressure in both chambers. In the event of a blowout it is equally desirable that passage of air through said port be retarded, so that the vehicle will be supported by the air in the inner chamber 13 for a sufficient interval of time as will enable the vehicle to be brought under control and brought to a stop. To this end the port 15 is provided with a valve member 18 that consists of a generally concavo-convex disc-like structure of resilient rubber composition that is formed with a flat circumferential flange 19. The valve member 18 is mounted upon the inner surface of the inner tubular structure 11, concentrically of the port 15 therein, the flange 19 being bonded to the inner tube structure preferably by vulcanization, with the concave side of the valve confronting said port. Integrally formed on the concave side of the valve structure is a cylindrical boss 20, the plane face of which is disposed a little to one side of the plane of the attaching face of flange 19, the arrangement being such that normally the boss is in sufficiently spaced relation to the port 15, as shown in Figures 2 and 4, as to enable the passage of air through the said port to the full limit of its capacity.

The effective cross sectional area of the port 15 is such that when the boss 20 of the valve member 18 is in its normally spaced position, it will be at least as great as the effective cross sectional area of the passage in the inflating valve stem 16 so that during inflation the air will flow into the outer chamber 14 as fast as the air enters chamber 13. This facilitates the inflation procedure and precludes a pressure differential between the two chambers during inflation which would give an incorrect indication of the pressure in the chamber 14 when the pressure is measured at the inflating valve 16. The said plane face of the boss is formed with a shallow diametric groove 22 of smaller volumetric capacity than the port 15, for a purpose which presently will be explained. Between the boss 20 and flange 19 the concavo-convex portion of the valve structure is formed with at least one aperture or port 21, which port is of smaller capacity than port 15, but of larger capacity than groove 22. The weight of the valve structure preferably is such as not to substantially unbalance the tire and tube assembly when placed opposite the valve stem 16, but is of such weight as to hold the valve structure against the tube wall 11 when the wheel rotates at a predetermined speed, or above, so that the valve 18 will be in a position to greatly restrict the flow of air from the inner chamber 13 to the outer chamber 14.

Figure 5:
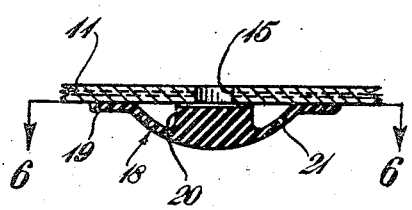
Figure 5 is a section similar to Figure 4 showing the valve in closed position.

The invention operates as follows. When the improved inner tube is mounted in a tire casing upon a vehicle, and the latter is stationary, the valve structure is in the position shown in Figures 2 and 4 of the drawing. Thus if the inner tube is being inflated, air will pass readily from the inner chamber 13, through port 21 in valve 18 and through port 15 in inner wall 11, into the outer chamber 14, thus establishing uniformity of pressure throughout the tube at once and facilitating the attainment of proper pressure. When the vehicle is in motion and the tires are rotating, centrifugal force acting upon the valve structure 18 flexes its concavo-convex portion outwardly radially of the inner tube with the result that boss 20 moves into engagement with the tube-wall 11, over the port 15, as shown in Figure 5, thus substantially closing off communication between chambers 13, 14 of the tube except as provided by the groove 22. Thus when a blowout occurs in a tire casing sustained by the improved inner tube, while the vehicle is in motion, the outer tube wall 10 will be ruptured and the air in outer chamber 14 quickly will leave. This creates differential air pressures in the inner and outer chambers 13, 14 such as to supplement the centrifugal force holding the valve in closed position. The air, slowly escaping by way of the groove 22, eventually will result in complete evacuation of the inner chamber 13, but not until sufficient time has elapsed to enable the vehicle to be brought to a stop. As soon as the vehicle is brought to a stop, the valve 18 is no longer subject to centrifugal force and as soon as the pressure in the chambers becomes more nearly equalized, it resumes the normal position shown in Figures 2 and 4, the remaining air in the inner chamber 13 thus being enabled quickly to escape.

From the foregoing it will be seen that the invention makes for safety in that a tire does not completely collapse in case of blowout but is able to provide adequate support to the vehicle until the latter can be brought to a stop. Thus the possibility of accident imperiling life and property is reduced to the minimum, rim-cutting of tires is avoided, and the driving of the vehicle upon a partly inflated tire for more than a short distance is prevented.

Figure 7:
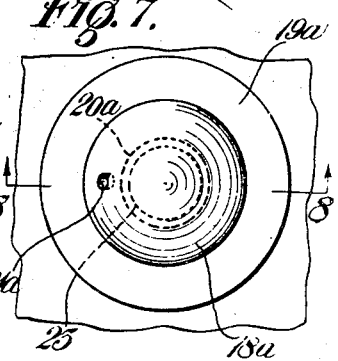
Figure 7 is a top plan view of another embodiment of the invention.
Figure 6:
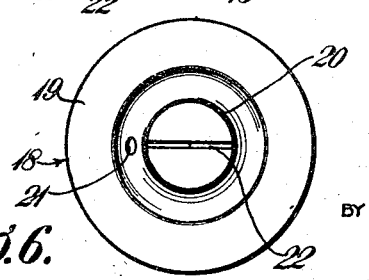
Figure 6 is a bottom plan of the valve as viewed on the line 6—6 of Figure 5.

The embodiment of the invention designated 18a and shown in Figure 6 and Figure 7 is essentially similar to that previously described, the concavo-convex portion, the flange 19a, and the port 21a being identical with similarly identified elements of the valve shown in Figures 2 and 5. The modified structure, however, differs in the internal construction of the axial boss 20a, which is weighted or loaded to insure a more positive action under the impetus of centrifugal force. To this end a cylindrical metal body 23, of brass or other suitable metal is incorporated in the said boss by being molded therein, the side of the metal body nearest the port 15a being uncovered and exposed to said port. This face of the metal body is formed with a diametric groove 22a that serves the same purpose as the groove 22 of the previously described embodiment of the invention. The operation of the modified structure is identical to the operation of the structure previously described, but in a more efficient and superior manner since the metal structure 23 is not deformed by the pressures to which it is subject during use, and the diametric groove 20a maintains its normal size and capacity under all conditions.

Other modification may be resorted to without departing from the spirit of the invention, or the scope thereof as defined by the appended claims.

What is claimed is:

1. A valve for an inflatable safety inner tube having an internal partition dividing the tube into concentric inner and outer air chambers, and a port in said partition providing communication between said chambers, said valve comprising a disc having a flexible concavo-convex medial portion formed with a marginal flange, the latter adapted for attachment throughout its area to the inner face of the partition, and surrounding the port therein, with the concave side of the disc confronting said port, an axial boss formed on the concave side of the valve-disc normally adapted to stand in spaced relation to the said port but movable to close the same under the impetus of centrifugal force, a metal weight incorporated in said base, and a port in the concavo-convex portion of the disc.

2. A valve for an inflatable safety inner tube having an internal partition dividing the tube into concentric inner and outer air chambers, and a port in said partition providing communication between said chambers, said valve comprising a disc having a flexible concavo-convex medial portion formed with a marginal flange, the latter adapted for attachment throughout its area to the inner face of the partition, concentrically of the port therein, with the concave side of the disc confronting said port, an axial boss formed on the concave side of the valve-disc normally adapted to stand in spaced relation to the said port but movable to close the same under the impetus of centrifugal force, a metal weight incorporated in said boss and having an exposed face adapted to confront said port, and a port in the concavo-convex portion of the disc.

CHARLES S. PIDGEON.